(12) United States Patent
Faulkner et al.

(10) Patent No.: US 7,291,364 B2
(45) Date of Patent: Nov. 6, 2007

(54) HI-RESOLUTION THREE-DIMENSIONAL IMAGING APPARATUS FOR TOPOGRAPHIC AND 3D MODELS

(75) Inventors: Lawrence Q. Faulkner, Fillmore, CA (US); Mark E. Fisher, Moorpark, CA (US); Justin Luton, Simi Valley, CA (US)

(73) Assignee: Solid Terrain Modeling, Fillmore, CA (US)

( * ) Notice: Subject to any disclaimer, the term of this patent is extended or adjusted under 35 U.S.C. 154(b) by 919 days.

(21) Appl. No.: 09/958,208

(22) PCT Filed: Apr. 6, 2001

(86) PCT No.: PCT/US01/10999

§ 371 (c)(1),
(2), (4) Date: Oct. 5, 2001

(87) PCT Pub. No.: WO01/77985

PCT Pub. Date: Oct. 18, 2001

(65) Prior Publication Data

US 2002/0138228 A1 Sep. 26, 2002

Related U.S. Application Data

(60) Provisional application No. 60/195,129, filed on Apr. 6, 2000.

(51) Int. Cl.
*B05B 13/04* (2006.01)
(52) U.S. Cl. .................................. 427/427.2
(58) Field of Classification Search .............. 427/427.2
See application file for complete search history.

(56) References Cited

U.S. PATENT DOCUMENTS 4,029,006 A * 6/1977 Mercer ....................... 101/35

(Continued)

FOREIGN PATENT DOCUMENTS

EP          0 706 102        4/1996
WO       WO 94/27198       11/1994

*Primary Examiner*—Matthew Luu
*Assistant Examiner*—Ari M. Diacou
(74) *Attorney, Agent, or Firm*—Reed Smith LLP

(57) ABSTRACT

The present invention is directed to an automated system that includes a hi-resolution three-dimensional imaging apparatus for topographic modeling that is electronically coupled with a computer. The system incorporates one or more algorithms for converting the complex and randomly-occurring contours found in natural terrain into an efficient series of adjacent and parallel coloring-agent imaging paths or swaths (comprised of inks, dyes, paints, and/or pigments). The swaths are defined in simplified 2-axis surface contour-following printer-head movements by the system's CPU, printer driver software, driver circuitry and/or logic circuitry. This multi-axis control of the system assures that each of the swaths are seamlessly rendered next to one another while also maintaining an optimal proximity between the upper surface of the 3D model and the nozzle end of one or more hi-resolution printer. A single coloring-agent such as black ink, may be used solely, or in combination with a plurality of colors such as a Cyan, Magenta, Yellow and Black or "CMYK" combination. The system also incorporates algorithms for applying accurately registered indicia of a prescribed color, or colors, onto the surface of models including man-made boundaries such as property lines, easements, right-of-ways, land-development features; naturally occurring boundaries such as ridges and flow-lines, bodies of water, lakes, lake-beds, rivers, river-beds and forested areas including tree varieties; lettering including the accommodation of a variety of fonts; graphical embellishments; and cartographic elements.

47 Claims, 8 Drawing Sheets

U.S. PATENT DOCUMENTS 4,132,575 A * 1/1979 Suzuki et al. .................. 156/58
4,246,840 A * 1/1981 Yoshino et al. ............... 101/37
4,514,674 A    4/1985 Hollis, Jr. et al.
4,820,900 A    4/1989 Höhle et al.
4,976,035 A * 12/1990 Levy et al. ................... 33/1 A
5,003,484 A    3/1991 Vollmayr
5,121,329 A * 6/1992 Crump ....................... 700/119
5,506,607 A * 4/1996 Sanders et al. ................ 347/1
5,857,066 A * 1/1999 Wyche et al. ............... 345/420
6,234,606 B1 * 5/2001 Suzuki ........................ 347/43
6,405,095 B1 * 6/2002 Jang et al. .................. 700/118

\* cited by examiner

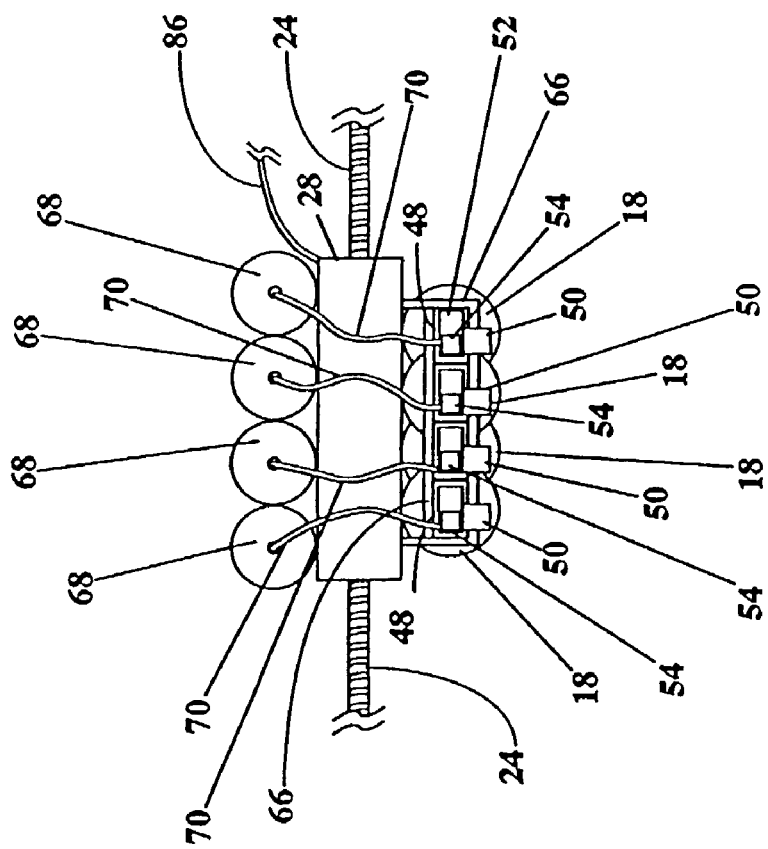
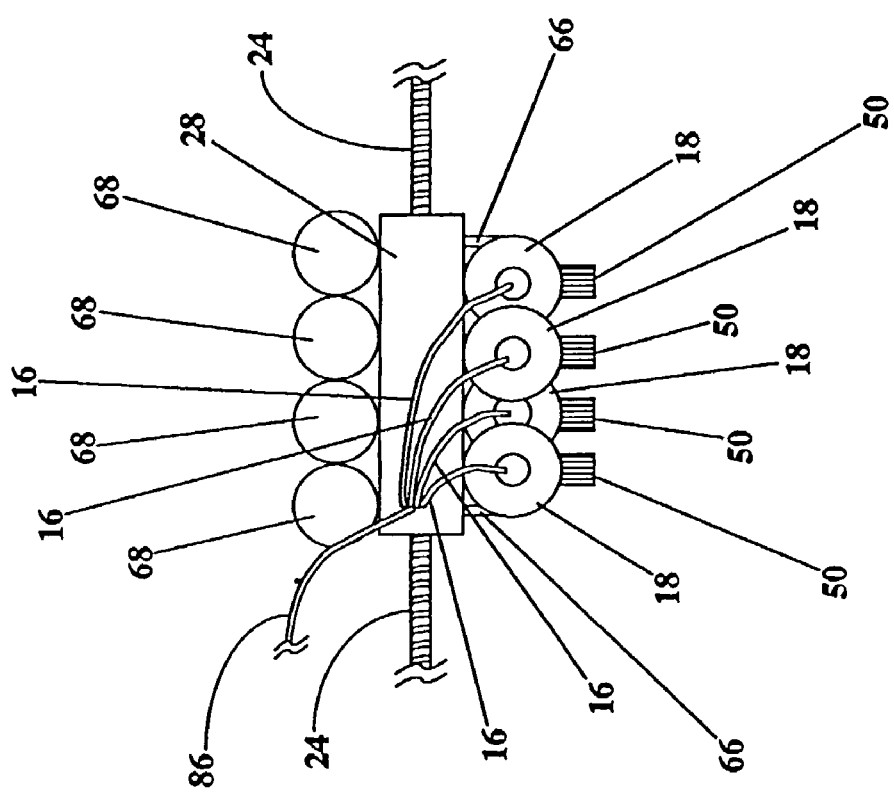

HI-RESOLUTION THREE-DIMENSIONAL IMAGING APPARATUS FOR TOPOGRAPHIC AND 3D MODELS

This application claims the benefit of U.S. Provisional Patent application Ser. No. 60/195,129 filed on Apr. 6, 2000, the entire disclosures of which are incorporated herein by reference.

BACKGROUND OF THE INVENTION

1. Field of the Invention

The present invention generally relates to apparatus, methods and systems for printing in hi-resolution onto the surface of topographic and three-dimensional models, and more specifically, it pertains to apparatus for accurately and durably rendering topographic, photographic and/or cartographic content onto the surface of three-dimensional (3D) terrain models generally, or for making such models quickly when needed in emergency situations, or for adding accurately and durably registered indicia to any in a variety of types of topographical models.

2. Description of Related Arts

Three-dimensional topography, and the cartography related thereto, have been useful media in assisting in the visualization of features pertaining to specific geographical locations. It is quite typical for the human mind to assimilate the physical structure of things—and of the world around us, in a three-dimensional context. For example, when one sees an actual mountain peak that looms over a valley it is very easy to tell that the elevation of the peak is substantially higher than the floor of the valley below. Similarly, three-dimensional topography (and cartography applied to 3D surfaces) offers quick assimilation of elevational and scale features, such that the relative size, height and location of a mountain peak in relationship to a valley on a 3D physical model, or scaled terrain model, is also very easy to see. By contrast, two-dimensional map reading, or 2D topographical visualization, particularly by individuals who are not often exposed to such maps, can be much more challenging and is typically a skill that has to be learned and is developed over time. There are various fields where the perusal of 3D terrain models is very helpful, and can be instrumental in critical decision making particularly during emergency situations. For example, one such field is fire-fighting. Wildfires occur in numerous terrain under a variety of conditions that can influence their movement and shifting of movement. One of these conditions is wind, whose speed and direction can be affected by the terrain it moves over and by the movement of the wildfire in such terrenes. Thus, the ability to understand topography easily and quickly, and to communicate to others the concerns and issues related to such terrain is very important. One of the applicants of the present invention has recently provided accurate 3D terrain models, on a quick turnaround basis to the U.S. Department of Forestry and to fire-fighters of Ventura County, Calif. During the handling of fires by these agencies, computer topographical data was quickly sent which was converted into a format suitable for accurately rendering the 3D models as needed for effectively managing these emergencies. The accuracy and 3D depiction of the terrain, and the speed in which the models were made, made it possible to easily oversee and update wildfire status and communicate terrain concerns to, and thereby supervise, the fire-fighting crews. Such topographical modeling advantages can also be applied in other emergency conditions, such as flooding, or avalanche management, or in military arenas including battlefield oversight and management.

While it is noted herein that an efficient modeling technique is highly desirable in providing quickly-created and accurate 3D terrain models for emergency situations, it is also noted that many non-emergency-related enterprises (including other types of 3-D modeling) can benefit from accurately made models as well. It is apparent that both emergency and non-emergency sectors, and other modeling enterprises would greatly benefit from models which also incorporate hi-resolution printing, for example when any or all of the following detail or imagery is also rendered onto the surface of such models: topographic, cartographic, photographic, graphic, content, and accurately and durably registered indicia for defining important surface features and/or boundaries whether naturally-occurring or man-made. Further, hi-resolution imaging is applicable to 3D objects such as in prototyping (e.g., new products, new manufacturing parts, and the like).

For example, such hi-resolution printing rendered onto the surface of accurately-made 3D models would be of great use to agencies, businesses, and professions concerned with: land development, architecture, land disputes (court cases), environmental studies, surveying, geological studies (e.g., oil exploration), surface mining, planning and remediation, resort and National Park modeling, waterway planning (e.g., for canals or shipping lanes), hydrography (e.g., underwater topography, dredging studies, port design), landfill planning and staging, extraterrestrial modeling (e.g., surface terrain of Mars or other planets, or asteroids), prototyping, and so forth. It is the purpose of the present invention to provide the means for imaging hi-resolution printing onto such models as needed.

Two-dimensional imaging and printing techniques are well-known particularly in the arenas of black and white printers and photocopy machines. However, none of these technologies provide the means for imaging content of similar resolutions onto the surface of topographical, or other 3D, models. Numerous attempts have been made to provide methods for imaging one or more of the above-mentioned content onto the surfaces of 3D models such as terrain models or architectural models—to more clearly define places, locations, or regions. However the techniques used to render such surface features on 3D models while also indicating their relative positions have remained either coarse in implementation, or they have remained overly time-consuming or complicated when the image-content is hand-done. Most approaches to date comprise various methods of topographical model making that is done by hand or has indicia or "terrain accessories" that are placed by hand on 3D models—and therefore are subject to human error particularly when the scale of the content is small and hi-resolution.

Similarly, a hand-made approach is also used for adding indicia to 3D terrain models, including the methods of carefully applying narrow adhesive tape to the surface of the model, or interconnecting a series of pins with thread, to show outlines, boundaries, or define other surface features. Other methods include optical projection of map detail onto 3D terrain models to trace such details by hand. Each of these methods are very time-consuming and subject to human error.

In U.S. Pat. No. 5,326,267, Brokaw employs "Model terrain accessories that are positioned for use on the surface of a miniature landscape are fabricated from a permanently flexible material, preferably polyvinyl chloride . . . " and states that "These flexible accessories are realistically contoured models representing roads, streams, stream banks, earthworks, and walls, or segments thereof." Brokaw's approach subject to human error, suggesting a time-consuming process where numerous 'accessories' would need to be added to maps, each of which would be subject to movement in position, raising questions as to the durability of this approach particularly for in-the-field applications. U.S. Pat. No. 5,793,372 belonging to Binns, et. al. describes "Methods and apparatus for rapidly rendering photo-realistic surfaces on 3-dimensional wire frames automatically using user defined points . . . " however their approach is for digital modeling, of the type used for viewing on a computer screen (i.e., for models inside a computer).

Thus, none of the above-referenced prior art incorporates the accurate topographic method and repeatability of a computer-imaging system comprising apparatus for imaging hi-resolution content onto the surfaces of terrain models, and other 3D models, and for rendering accurately registered indicia onto the surfaces of such models.

Thus there is a need for the apparatus of the present invention and for the improved methods thereof that can produce hi-resolution imagery and indicia on terrain models and can do so efficiently and quickly (for example in response to emergency conditions) and produce models that have more accurate and aesthetic detail.

SUMMARY OF THE INVENTION

It is the object of the present invention to provide such benefits and to overcome the time-consuming and less accurate disadvantages of both the prior art and the current status quo in terrain modeling, 3D-modeling and the making and imaging of 3-D objects.

In accordance with the present invention, methods are defined for apparatus having computer and efficient algorithmic control of one or more printer heads to: (1) apply a coloring-agent such as ink in a series of parallel paths to the surface of terrain, and other, models, and (2) apply durable and accurately registered and scaled indicia onto the surface of any in a variety of types of topographical, and other, models.

Another aspect of the present invention is to provide an automated system for achieving the above-mentioned methods. The system includes a hi-resolution three-dimensional imaging apparatus for topographic modeling that is electronically coupled with a computer. The computer has a central processor that executes instructions, a memory for storing instructions to be executed, and non-volatile storage for storing the messages. The executable computer instructions of the system include one or more algorithms for converting the complex and randomly-occurring contours found in natural terrain into an efficient series of adjacent and parallel coloring-agent imaging paths or swaths (comprised of inks, dyes, paints, and/or pigments). In a preferred embodiment of the invention, the swaths are defined in simplified 2-axis surface contour-following printer-head movements by the system's CPU, printer driver software, driver circuitry and/or logic circuitry. This multi-axis control means of the system assures that each of the swaths are seamlessly rendered next to one another while also maintaining an optimal proximity between the upper surface of the 3D model and the nozzle end of one or more hi-resolution printer heads (approximately less than 0.650"). A single coloring-agent such as black ink, may be used solely, or in combination with a plurality of colors such as a Cyan, Magenta, Yellow and Black or "CMYK" combination. The system provides an economy of movement in the 2-axis surface contour-following mode and a commensurate efficiency in speed in accurately applying black or colored imaging, such as the above-mentioned content to terrain models, or three-dimensional objects. Other executable computer instructions of the system include one or more algorithms for applying accurately registered indicia of a prescribed color, or colors, onto the surface of models. These indicia, when occurring on the terrain models, include, but are not limited to the formation of: man-made boundaries such as property lines, easements, right-of-ways, land-development features (e.g., grading demarcations, grade breaks, cuts and fills); of naturally occurring boundaries such as ridges and flow-lines, bodies of water, lakes, lake-beds, rivers, river-beds, forested areas including tree varieties, and so forth. The indicia can also include precisely registered: lettering including the accommodation of a variety of fonts; graphical embellishments (e.g., line art, filigree, vector outlines etc.); and, cartographic elements such as scale bars, compass roses, map legends, registration marks, latitude and longitude lines/markings, overlay of coordinate grid systems, and so on.

The system includes a print driver means and a control interface having an electronic coupling to control bi-directional control of a plurality of stepper motors, and to control the starting, stopping, and amount, of coloring-agent such as ink which is dispensed from one or more hi-resolution print heads (or other coloring-agent dispensing means), such that the motion-control and the print driver instructions of the system are coordinated by the system's CPU, printer driver software, driver circuitry and/or logic circuitry, and render black and/or colored imaging that is hi-resolution and very accurately registered. The system interface can include the driver circuitry and/or logic circuitry and can be housed external to the computer and separate from the stepper motors, and one or more of the apparatus-controlling components housed therein can instead be located within the housing of the computer (e.g., on a circuit board interfaced with the CPU of the computer). Alternatively, one or more of such components could be located within, or mounted adjacent to, one or more stepper motor housings. The system also includes multi-axis actuation means, and a computer and interface control of same, including a plurality of stepper motor-driven lead-screws (at least one per axis) operative in one or more followers that are affixed to carriages—each carriage moveable in a single-axis. The above-mentioned print head(s) is affixed to, and operative from, one of the carriages.

Thus, when a stepper motor rotates as directed by the executable instructions of the system's computer, it causes a lead-screw coupled to the motor to displace its respective follower (and attached carriage) proportionate to a calibrated degree of rotation and pitch of the lead-screw thread. While it is describe in more detail in the section below pertaining to the drawings of the invention, it is noted in the invention summary that the stepper motors could alternatively drive other types of carriage actuating means such as systems that incorporate belts and pulleys, or rack and pinion types of actuation, (including armatures, or connecting rods). In any case, the system provides one or more surface contour-following, or 3D-following, printer heads that are moveable in a multi-axis computer-controlled system. In one mode, the system actuates the movement of carriages to cause a hi-resolution imaging of coloring agent swaths, such as ink, which are defined in a series of parallel and adjacent print paths, by varying the depth of one or more hi-resolution print heads in a Z-axis to keep its proximity within a hi-resolution (e.g., 100-1400 dpi) imaging range such that the parallel and adjacent print paths on the modeling material are sequentially and seamlessly rendered. For further optimizing ink droplet transmission from an inkjet nozzle to the upper surface of a 3D model, the apparatus can optionally be placed in an environment having a reduced atmospheric or near-vacuum condition. In other motion-controllable modes, the system's carriages can be actuated to cause a finished terrain model, or other 3D model, to be imaged by varying the depth of one or more print heads in a coordinated movement with one or more other axes to (1) durably and accurately image registered indicia of a prescribed color, or (2) raster hi-definition photographic content, onto the surface of 3-D models.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 depicts the top view of an X-axis carriage having a plurality of stepper motors mounted adjacent to one side and a plurality of coloring-agent reservoirs mounted adjacent to an opposite side.

FIG. 6 shows the bottom view of the X-axis carriage of FIG. 5 having a plurality of coloring-agent reservoirs mounted adjacent to one side of the carriage, each reservoir having a coloring-agent transfer tube coupled to a lower end thereof extending to and coupled with a print head that is operative from a lower end of a Z-axis carriage such that each Z-axis carriage is slidably mounted within Z-axis guide means which extends outward from a side of the X-axis carriage.

DESCRIPTION OF THE PREFERRED EMBODIMENT

Figure 1:
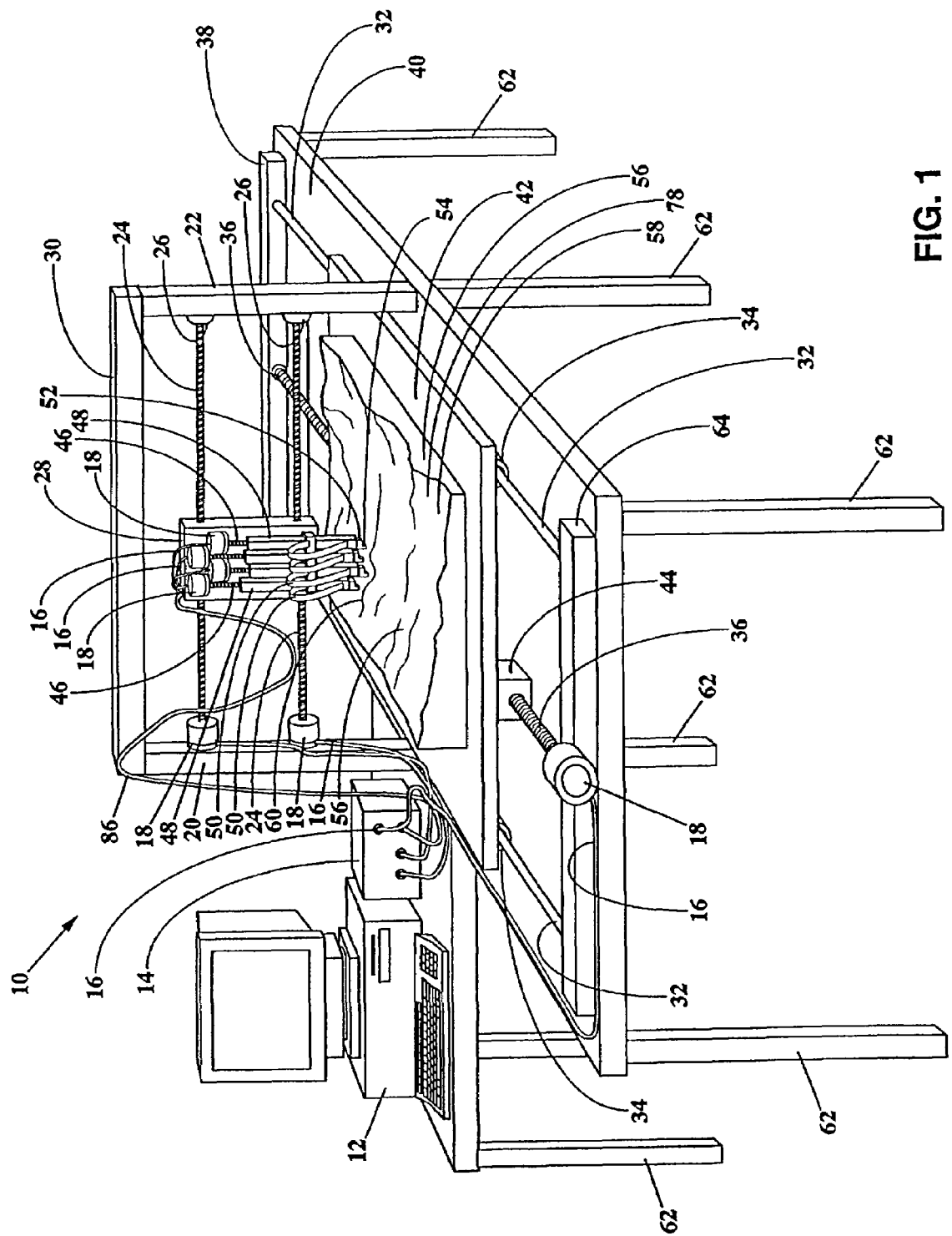
FIG. 1 is a three-dimensional view of a hi-resolution 3D printing apparatus for imaging content onto topographical, and other 3D, models, comprising a computer system, a control interface, and a multi-axis control means, which collectively direct one or more printer heads through a series of parallel and adjacent paths to thereby render hi-resolution content onto 3D models.

With reference to FIG. 1, a hi-resolution 3D printing apparatus 10 for imaging content onto topographical, and other 3D, models, is shown adjacent to, and is electronically coupled with, a computer system 12. The computer has a central processor that executes instructions, a memory for storing instructions to be executed, and non-volatile storage for storing the messages. Also included is a control interface 14 having electronic coupling 16 to control a plurality of stepper motors 18. It is noted that although interface 14 is shown in a housing which is external to the computer and separate from the stepper motors, one or more of the apparatus-controlling components housed therein could instead be located within the housing of the computer (e.g., on a circuit board interfaced with the CPU of the computer), and/or could be located within, or adjacent to, one or more stepper motor housings. Adjacent to computer 12 and interface 14 is a Y-axis support bed 40 that is supported by legs 62. The upper surface of bed 40 supports rear end-block 38 and front end-block 64 which in turn support two of Y-axis guide rod 32 and an Y-axis lead-screw 36 the latter of which is rotatably coupled to a stepper motor 18 on one end (e.g., by a misalignment coupler, not shown) and is otherwise free-spinning at its opposite end within a portion of rear end-block 38 (e.g., within a bushing or bearing mounted therein). Lead-screw 36 extends through at least one lead-screw follower 44 which is attached adjacent to an underside surface of Y-axis carriage 42. Also attached to the underside of Y-axis carriage are a plurality of guide-rod friction-reducing means 34 (e.g., pillow blocks). While Y-axis carriage 42 is shown being guided in the Y-axis with the combination of rods and pillow blocks, it is noted that any one or more of a variety of known guides and friction-reducing means can alternatively be employed (e.g., wheels on rails). The upper horizontal surface of Y-axis carriage 42 accommodates a topographical modeling material 56 such as low-porosity foam (higher porosity foam may also be used depending on the desired resolution of the finished model). Extending perpendicularly from bed 40 are X-axis motor-support member 20 and X-axis lead-screw support member 22, the upper ends of which are connected to lower opposite ends of upper cross-member 30—the three members forming an inverted U-shape. The inverted-U is shown supporting two of stepper motor 18 each having one end of an X-axis lead-screw 24 rotatably coupled thereto (coupling not shown) such that the parallel lead-screws traverse from motors 18 through X-axis carriage 28 and followers resident therein to lead-screw friction reducing means 26 mounted on an inward-facing surface of member 22. A plurality of stepper motor 18 are mounted to an upper forward-facing end of X-axis carriage 28, each having a Z-axis lead-screw 46 rotatably coupled thereto that extends into an upper end of a respective Z-axis carriage 48 and at least one follower resident therein (follower not shown). Z-axis carriages 48 are slidably mounted to X-axis carriage 28 and may include one or more Z-axis guide means 66 and/or friction-reducing means such as any one or more of a variety of known means to facilitate free movement in a single axis (e.g., tongue-in-groove guides, guide bearings or guide rollers, and the like—not shown). Each Z-axis carriage has a print cartridge 52 mounted adjacent to a lower end thereof such that a print head 54 coupled with a ribbon cable 50 is positionable in a surface contour-following fashion above a X-Z axis surface profile 60 of topographical surface 58. The top of X-axis carriage 28 is seen coupled to a multi-conductor cable 86 which is bundled with the number of wires necessary to control each of the stepper motors 18, and each of the print heads 54 (via their respective ribbon cables 50). The preferred embodiment of the invention shows a plurality of Z-axis carriages 48 and print heads 54 slidably mounted to X-axis carriage 28. However, it is noted that X-axis carriage 28 can alternatively be scaled narrower in size to accommodate a single Z-axis carriage 48 and print head 54 for single-color ink printing.

Although the inverted U-shape in FIG. 1 comprised of members 20, 22 and 30 is shown having a fixed position, it is noted that the combination of these members could alternatively form an inverted U-shaped gantry which could be moved and actuated fore and aft in the Y-axis. For example, modeling material 56 could rest on the uppermost surface of bed 40 and the gantry could be actuated fore and aft over the modeling material. In which case, two of stepper motors 18 each mounted at opposite upper ends of front end-block 64 can have a Y-axis lead-screw 36 rotatably coupled thereto such that one lead-screw extends through a lower portion of member 20 and the other lead-screw extends through a lower portion of member 22 (each member having at least one follower within the lower portion traversed by the respective lead-screws) and be rotatably mounted at an opposite ends within rear end-block 38. Thus, a simultaneous spinning of both motors and the respectively coupled lead-screws would cause a corresponding Y-axis movement of the inverted U-shaped gantry.

While each of X-axis carriage 28, Y-axis carriage 42, and Z-axis carriage(s) 48 is shown being actuated with the combination of one or more stepper motors, lead-screws and followers, it is noted that any one or more of a variety of known carriage actuation means can alternatively be employed, such as a stepper motor-driven belt and pulley means, or stepper motordriven rack and pinion means, stepper motor-driven armatures, linear actuators, and the like. Similarly, one or more of the stepper motors can alternatively be replaced with servos or other actuation means. It is also noted that, although X-axis carriage 28 is shown being actuated by two of lead-screw 24, it is apparent that the X-axis carriage can alternatively be actuated by a single X-axis lead-screw 24. Furthermore, it is noted that although the methods described thus far in the imaging of hi-resolution models have illustrated apparatus having three axes of controlled movement, it is apparent that control of more axes can readily be achieved. For example, a print head can be pivotally mounted to the Z-axis carriage and controlled within a pivotable range by executable instructions from the systems computer and interface. Alternatively, the addition of rotational computer motion-control is readily incorporated by the apparatus of the present invention by the addition of a stepper motor-driven turntable having a base mounted adjacent to an upper surface of Y-axis carriage such that the surface of the turntable is parallel to the surface of the carriage. And orbital printing paths are readily achieved by a stepper motor-driven spindle positioned in a manner to align the rotational axis of a rotatably mounted modeling material such that it is perpendicular to the Z-axis. Thus, systems having more than three axes of control and systems providing rotational and orbital printing paths are also readily achieved by the systems, methods, and apparatus of the present invention.

In operation, a 3D model, or 3D object, is temporarily secured to the upper surface of Y-axis carriage 42. The production of the 3-D model of the present invention is described in of U.S. Provisional Patent application Ser. No. 60/195,130 filed on Apr. 6, 2000, and its corresponding regular U.S. Patent Application filed concurrently with the present application. The disclosure of both applications is hereby incorporated by reference.

Existing terrain data or elevation data is usually in one of three forms, 3D digital points, 3D digital contours or paper contours. The data is translated by software stored in the computer system 12 so as to create a seamless 3D digital mesh or grid. Specifically, the 3D coordinates for the actual data points are translated into a 3D mesh or grid of equivalent 3D coordinates for grid data points derived by interpolation from the original 3D coordinates. The equivalent grid data points correspond to the grid nodes of a predetermined matrix of A×A points. The value of A is based on the desired resolution for the intended final product, namely the 3D terrain model. Experimentation and actual use has found that a 2D matrix of 20×20 points per inch is optimal, though matrices as low as 10×10 points per inch have been used, while much higher densities of points per inch may also be used to obtain higher resolutions. As one of skill in the art would understand, the only limitation to using or obtaining a desired resolution is the type, size, material and quality of the printing head and inks available. For example, using more than 20×20 will improve the smoothness of the resulting surface but increase cutting time significantly. Using fewer than twenty will decrease the smoothness but decrease cutting time. Twenty rows and columns lines per inch is a preferred compromise between speed and quality. The sizes of the printing head 54 are chosen to fit the desired resolution.

With respect to the 3D digital points, one preferred method for translating the actual data points into grid data points of the 3D mesh or grid is the triangulation with linear interpolation method. The Triangulation with Linear Interpolation method uses the optimal Delaunay triangulation. The algorithm creates triangles by drawing lines between at least three actual data points that surround a given grid node; actual data points are considered to surround a grid node when viewed when the xy-coordinates of the actual data points are projected onto the 2D matrix of grid nodes. However, unlike the actual data points, the 3D mesh or grid is an array of 3D grid data points that have consistent spacing and no unknown elevations (holes).

With respect to the 3D digital contours, the points from the contours are extracted and then interpolated to a 3D mesh or grid with any off-the-shelf CAD software. With respect to the paper contour data, the terrain data is initially composed of printed maps illustrating, among other features, surface contours and elevations. That contour and elevation data is digitized into xyz-coordinate data using known digitizing techniques, and then interpolated into the 3D mesh or grid.

In addition to the Triangulation with Linear Interpolation method, other interpolation methods are also applicable for interposing the 3D actual data points into the 3D mesh or grid; such methods include the Minimum Curvature method, Shepard's method, the Kriging method, Polynomial Regression method, the Inverse Distance to a Power method, the Nearest Neighbor method, and the Radial Basis Functions method.

In addition to xyz-coordinates in the actual data from the three existing terrain or elevation data (i.e., 3D digital points, 3D digital contours or paper contours), such initial data may include information relating to other features represented on the desired terrain model. Such features include urban/city layouts, roads (improved and unimproved), rivers, airports, and other natural or man-made features to the landscape. Such features may also include topographical data or other informational representations such as boundary lines, compass directions, country/state/city/county names and reference point names/coordinates. Such information may be formatted separately from the xyz-coordinate data so as to overlaid with the xyz-coordinates at a later point in time. Alternatively, such information may be incorporated into the whole of the data of the terrain to be modeled; one example of this situation is with paper contour data. In either situation, such additional information may be separated and thereby extracted from xyz-coordinate data using techniques known in the art (i.e., digitizing the data separately from the xyz-coordinate data). Also using known software techniques, the additional information may be converted into vector data and saved in a .txt file, so as to be usable by the apparatus of the present invention. As will be explained further hereinbelow, the vector data may be used to operate the system so as to print and represent the additional information into the terrain model.

Further, the initial data may include information relating to the color and gray scale of each xyz-coordinate whereby a desired terrain may be represented in full-color. Using known software techniques such as those available in commercially available graphics software packages (e.g., AutoCAD®, PhotoShop®), the color/gray scale data may be converted into, for example, bitmap data stored in .bmp files for use in printing full-color features onto the desired terrain model. Such bitmap data, as known in the art, may consist of separate bitmap files for each of the primary colors (i.e., red, green, blue) for use in full-color display monitors, or for use in full-color printers (i.e., inkjet printers) separate bitmaps for the four ink colors CMYK. In the preferred embodiments of the present invention, bitmaps based on the CMYK colors are used. As one of skill in the art would understand, the data in each of the separate bitmaps may be formatted using commercially available graphics software, so that different combinations of ink color, ink amount, ink spot density, etc. may be used to achieve variations in gray scale, color shade, etc. The structure and operation of the present invention using such bitmap data is capable of producing detailed images on the terrain model desired with a wide range of colors such that the printed images can appear very realistic.

The model, or 3D object, is made of a modeling material 56 suitable for receiving a sealer coating 78 or coloring-agent such as any one or more in a variety of inks, pigments, paints, or dyes. The system, including the computer 12, control interface 14, stepper motors 18 with coupled lead-screws and associated followers and carriages, are all responsive to limit switches and/or other sensors (not shown) to facilitate the positioning of at least one print cartridge and/or print head 54 in a beginning 'home' position. The computer system is equipped with executable instructions to achieve home positioning. Thereafter, stepper motor rotation of X-axis lead-screws 24 cause X-axis carriage 28 to move the tip of print head 54 (preferably having nozzle apertures providing hi-resolution output) to a beginning imaging position of the modeling material 56, for example to the upper corner of the material nearest to support member 22 and rear end-block 38. Once positioned for imaging, a single two-dimensional path parallel to the X, Z surface profile of the model is executed such that each Z-axis assembly—comprising a stepper motor 18, coupled lead-screw 46, carriage 48, print head 54 and coupled ribbon cable 50—is responsive to computer executable instructions and an automated surface contour-following movement which keeps each print head in proximity to the changing surface contour of the model is achieved. At the completion of the first X, Z path, stepper motor rotation of Y-axis lead-screw 36 causes Y-axis carriage 42 to move the model, or object, in the Y-axis in precise registration to the previous imaged path such that the next path is aligned with a non-imaged region of modeling material 56. A second two-dimensional path in the opposite X-axis direction from the first path is then executed. Thus in a series of parallel imaging paths implemented in a−X, +Y and variable Z alternating with a +X, +Y and variable Z repetitive pattern, one or more coloring-agents can quickly and accurately be imaged onto modeling material 56 to create hi-resolution, durable and aesthetic surfaces on each topographical or 3D model.

Although the efficient, accurate and quick method of imaging the surface of models is achieved with the previously mentioned repetitive pattern, it is also noted that the computer executable instructions of the system can include simultaneous relative movement caused by 3-axis carriage control. For example, when imaging just a curved outline, pattern, or other boundary, onto the surface of a model, the apparatus is equipped to control the movement of a plurality of carriages to quickly render such graphic elements, indicia, and the like, including the capability to define coordinated carriage movements within a limited surface area of models. Such imaginable elements and indicia include, but are not limited to: man-made boundaries such as property lines, easements, right-of-ways, land-development features (e.g., grading demarcations, grade breaks, cuts and fills); of naturally-occurring boundaries such as ridges and flow-lines, bodies of water, lakes, lake-beds, rivers, river-beds, and the like. The indicia can also include precisely registered lettering including the accommodation of a variety of fonts; graphical embellishments (e.g., line art, filigree, vector outlines, etc.); cartographic elements such as scale bars, compass roses, map legends, registration marks, latitude and longitude lines/markings; overlays of coordinate grid systems; and so on. Executable indicia-data instructions of the computer system of the present invention, in combination with the components comprising the system's control interface and coupled multi-axis actuation means (stepper motors and their respective lead-screws, followers and carriages), collectively maintain the relative movement of each print head 54 in close proximity with either the finished topography of terrain models, or the surface contour of 3D models. The computer executable instructions of the system include algorithms, or software routines, and printer driver instructions for interpreting any one or more of the following into imaginable content: computer-storable graphic or text files, such as color, or black and white, photographs, graphic art, vector outlines, cartographic symbols and embellishments, typographical elements including fonts and font styles, as well as the natural and man-made geographical demarcations as discussed above.

Figure 2:
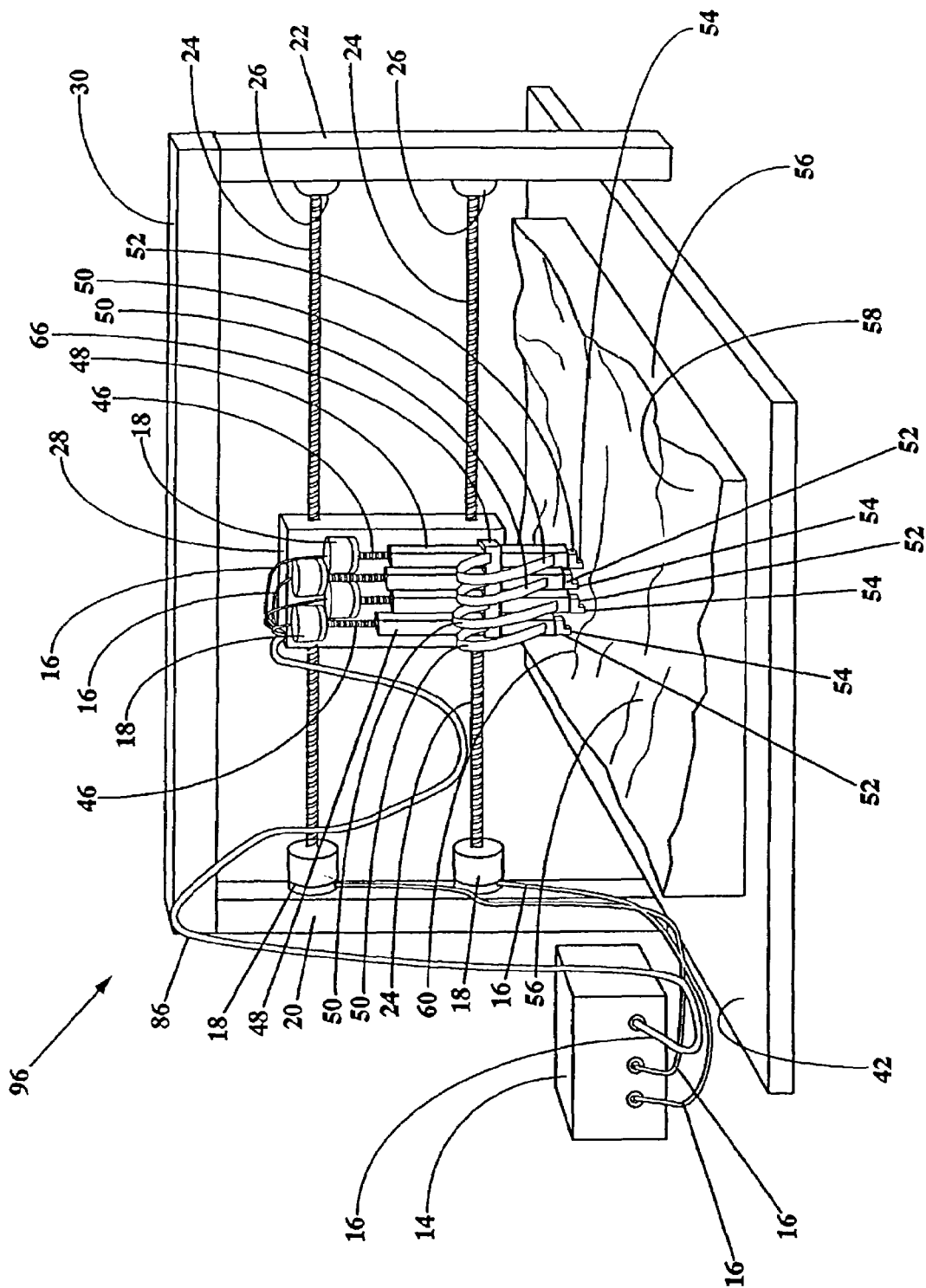
FIG. 2 is a close-up three-dimensional view of the control interface and two control axes of the multi-axis control means of FIG. 1 illustrating a printer-head surface contour-following methodology of the apparatus.

In reference to FIG. 2 a close-up three-dimensional view of the X-axis and Z-axis sub-systems of multi-axis control means 14 is shown illustrating an automated printer-head surface contour-following means that is provided by the multi-axis control means of the apparatus' system. An X, Z axis surface profile 60 is seen beneath an array of print heads 54 such that the lower end of each print head is maintained by executable instructions of the automated system within an optimum proximity to the surface profile as the X-axis carriage moves the print heads over the topographical surface 58 (or alternatively, over the surface of a 3D model).

The software that controls the apparatus of the present invention incorporates two main components: (1) the Job Definition Application, and (2) the Job Execution Application. For each desired terrain model, the Job Definition application receives the data files for the grid data points (.grd data), vector data (.txt data), and color/gray scale data (bit map data). The Job Definition application then interposes the three received data into a single .stm job file that is then used by the Job Execution application. In at least one implementation of the Job Definition application, the processes for (1) interpolating the actual data points into grid data points, (2) generating vector data for the .txt vector files, and (3) generating the bitmap data are incorporated into this applications functions. In other implementations, the above functions may be formed in separate applications that inter-operate with the Job Definition application or as applets, subroutines or their equivalents that are accessed by the Job Definition application, all of which one of ordinary skill in the art would understand given this disclosure of the present invention.

The .stm job file is then forwarded to the Job Execution application to be translated into motion files (machine control codes) for controlling the printing heads 54 to dispense the ink. The Job Execution application also receives user input data such as ink type, nozzle size, model material type, desired scale, etc. The Job Execution application then generates the tool path data or motion files based on the .stm job file and user inputted data, such as that described hereinbelow in the operation of the system. The motion files include data on the x-z movement of the system for each cross-section on a single path, as will be explained hereinbelow, as well as pixel data for the X-axis carriage 28, the Y-axis carriage 42 and the Z-axis carriage 48 moving along each path, depending on whether movement of the carriages will be based on a serpentine pattern using the .grd and .bmp files or on direct vector movement using the .txt vector files.

Figure 10:
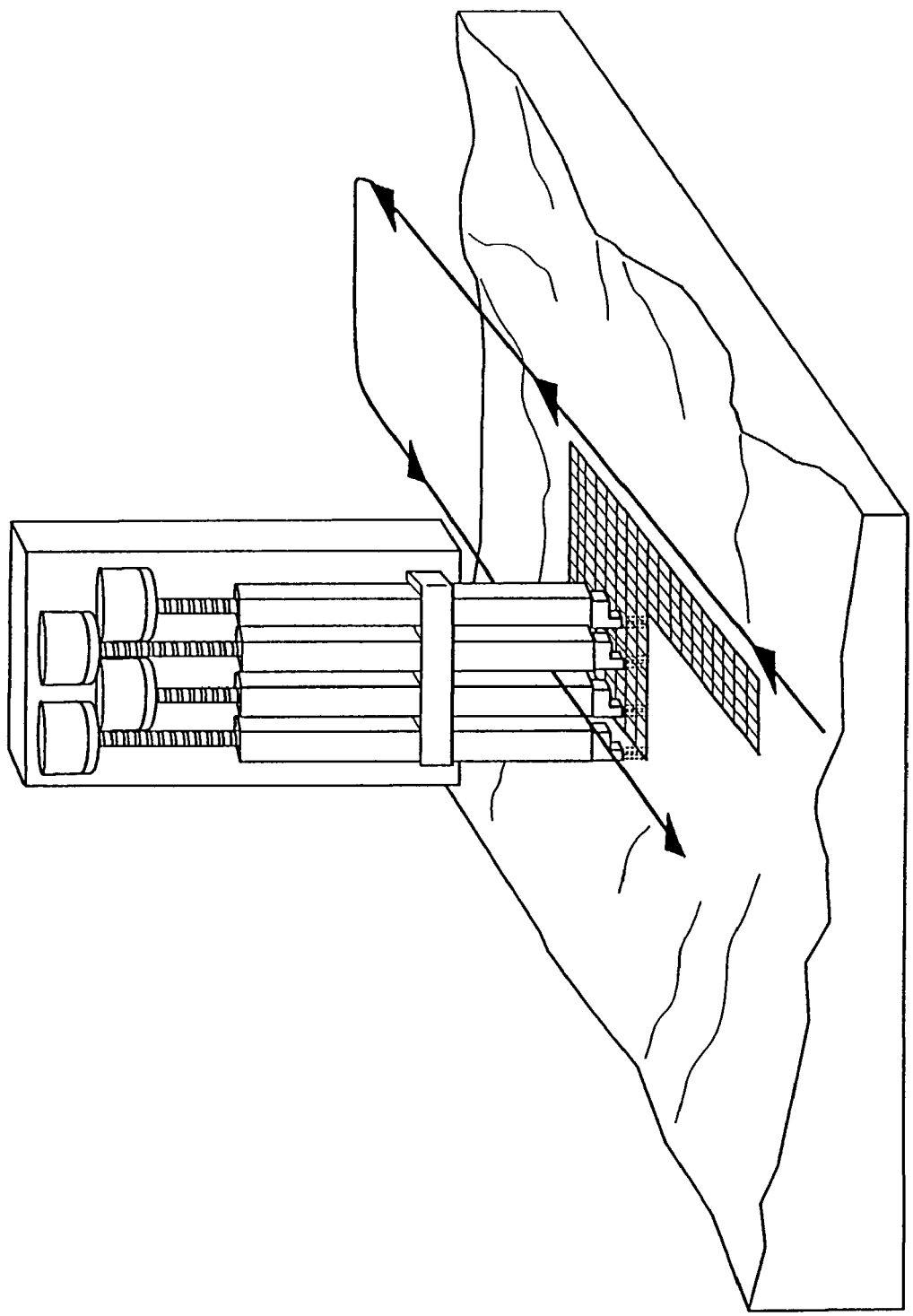
FIG. 10 is a perspective view shown the dispensing means of the present invention travelling in a serpentine pattern among grid points.

In the operation of the system, as shown generally in FIG. 10, motion files are used to control the print heads 54 such that each individual print head for each color will spray its ink onto the surface 58 in successive cross-sections. As noted above, the print heads 54 travel along the 3D mesh or grid, in a serpentine pattern, from one end of the material to the other along a single path, and then in the opposite direction from one end to other along the next path. As the print heads complete one path, they together move or jog to the next successive path and print along the next path in the opposite direction. Each of the paths represents a single cross-section of the terrain to be modeled along the x-z plane. Alternatively, when operating based on .txt vector file data, the print heads 54 are moved via the X-axis carriage 28, the Y-axis carriage 42, as well as the Z-axis carriage 48, in direct motions as determined by intended images to be printed.

Also as noted above, the Job Execution application controls the movement of the print heads 54 along the surface 58 as well as the firing of each of the print heads so as to spray the appropriate color of ink at the appropriate time and location. Even more, the Job Execution application adjusts the moving speed of the single axis carriages 28, 42, 48 to compensate for movement along horizontal surfaces versus sloped surfaces versus vertical or near-vertical surfaces. Specifically, the speed of the carriages is adjusted so as to allow ink to be uniformly distributed on the surface 58 in accordance with the desired color and, for near-vertical surfaces, ink to be sprayed onto areas that would not otherwise be printable.

In one implementation of the Job Execution application, a user may input modifications to the machine control codes during operation such that a user can interrupt the printing anytime to make changes to the operation such as re-aligning the printing heads 54, jogging the printing heads 54 to perform a modified print, calibration, maintenance or changing the printing heads 54.

In another embodiment, the Job Execution application is further equipped with artificial intelligence or other equivalent analytical applications which can reconcile inconsistent parameters, identify and correct radical changes in data, identify errors ("abnormalities") in the system, generate warnings, and incorporate safety protocols automatically. Alternatively, a user may simply take over control of the system.

For example, the leftmost print head in FIG. 2 is seen in the highest Z-axis position and the next print head to the right is seen in the lowest Z-axis position corresponding to the contour of profile 60. The print head proximity to the model surface is constantly maintained, updated, and coordinated by executable computer instructions during any movement of the model relative to the print heads 54. The print heads 54 of FIG. 2 can each provide a different color of ink, for example, cyan, magenta, yellow and black respectively (CMYK). When so configured, the print heads can track the same X-axis path (and its respective Z-axis contour) responsive to executable computer instructions—including printer driver instructions—which time the dispensing of each ink in precise registration relative to the position of the ink which has been dispensed by one or more adjacent print heads. After each X-axis path ink-swath, the topographical surface 58 (or other 3D model surface) is offset by executable computer instructions in the Y-axis equal to the width of the previous ink swath, and the order of the ink dispensed in the X-axis and the precise registration of the position of each ink dispensed by the adjacent print heads is reversed. Alternatively, a plurality of print heads 54 can be arranged in an array with each print head providing the same ink color or pigment (e.g., black) such that X-axis carriage 28 remains stationary for the duration of each Y-axis pass of a model thereunder, thus applying a combined swath of the same color along parallel and adjacent Y-axis paths.

In a more expensive but hi-speed embodiment of the invention, a multiplicity of adjacent surface contour-following print heads 54 each dispensing the same ink color or pigment in parallel and contiguous ink swaths, can be configured having a number sufficient to extend over a substantial, or entire, width of a topographical, or a 3D, model such that in as few as one Y-axis pass of a model thereunder, a hi-resolution printed surface (e.g., a grayscale image) is rendered on the model (not shown). In such a case, the X-axis control means can be eliminated and models simply pass in the Y-axis beneath a contiguous swath of same-colored ink. For example, sixty printer heads 54 each having a ½" black-ink or grayscale ink swath are alignable in an X-axis such that each swath is adjacent to a neighboring swath (with each head linearly actuatable in the Z-axis to track Y-axis terrain) and renders a 30" contiguous swath over a 30" wide model in a single Y-axis pass of the model thereunder. Furthermore, it is noted that a combination of four of such sixty-print head arrays—each array providing one of the C,M,Y,K colors or pigments—could render 30" wide full-color hi-resolution models in efficient hi-speed single passes. Such hi-speed systems would be ideal for the creation of models needed for emergency situations such as those previously mentioned, or for other conditions having tight deadlines.

Figure 3:
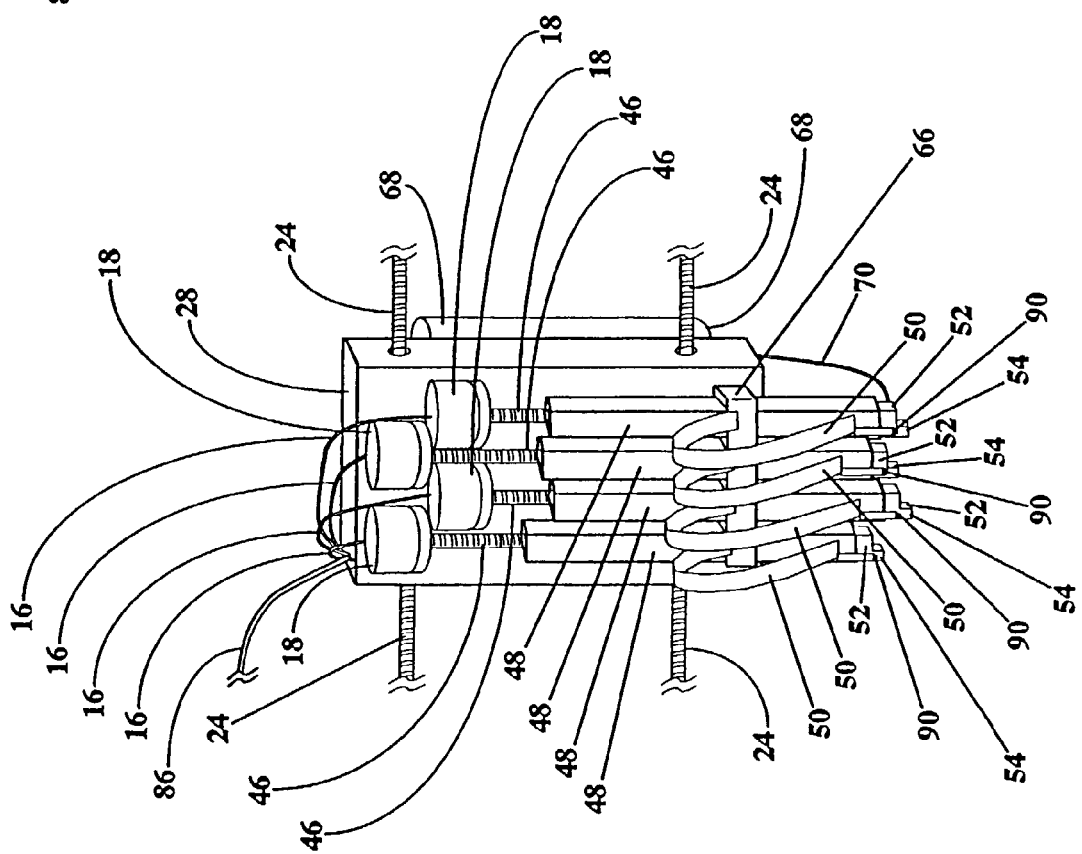
FIG. 3 is a close-up three-dimensional view of the X-axis carriage seen in FIG. 1 having a plurality of stepper motors operative on one side, each motor actuating a respective lead-screw, Z-axis carriage and print head, and X-axis carriage having at least one coloring-agent reservoir mounted adjacent to an opposite side.

FIG. 3 is a close-up three-dimensional view of the X-axis carriage 28 seen in FIG. 1 having a plurality of Z-axis stepper motors 18 operative on one side, each motor actuating a respective lead-screw 46, Z-axis carriage 48 and print head 54, and X-axis carriage 28 having at least one coloring-agent reservoir 68 mounted adjacent to an opposite side. Coupled to an upper region of carriage 28 is the end of multi-conductor cable 86 which supplies electronic transmissions to stepper motors 18 via transmission means 16 and optionally provides electronic transmissions through multi-conductor cabling to each print head 54 through an internal passageway of carriage 28 to each ribbon cable 50 via an internal passageway through Z-axis guide means 66. Each of ribbon cable 50 is of a suitable length and coupled in a manner to readily flex and allow repetitious movement of its respectively coupled print head. FIG. 3 shows a print cartridge 52 mounted in a lower region of each Z-axis carriage 48 such that the print cartridge and print head are both part of an integral print head/print cartridge unit. However, it is noted that the print head itself can be separately mounted in a lower end of each Z-axis carriage 48 and that the supply of ink, pigment, or other coloring-agent, normally stored within an ink, or pigment, coloring-agent reservoir of an integral print cartridge can instead be conducted from a separate coloring-agent reservoir 68 to one or more print heads 54 via respective coloring-agent transfer tube(s) 70. Thus, each coloring-agent reservoir 68 is capable of supplying a relatively large volume of ink, pigment, or other coloring-agent, to a separate color dispensing means such as the previously mentioned separate print heads and the typical replenishment cycles associated with smaller ink cartridge reservoirs is avoided.

Figure 4:
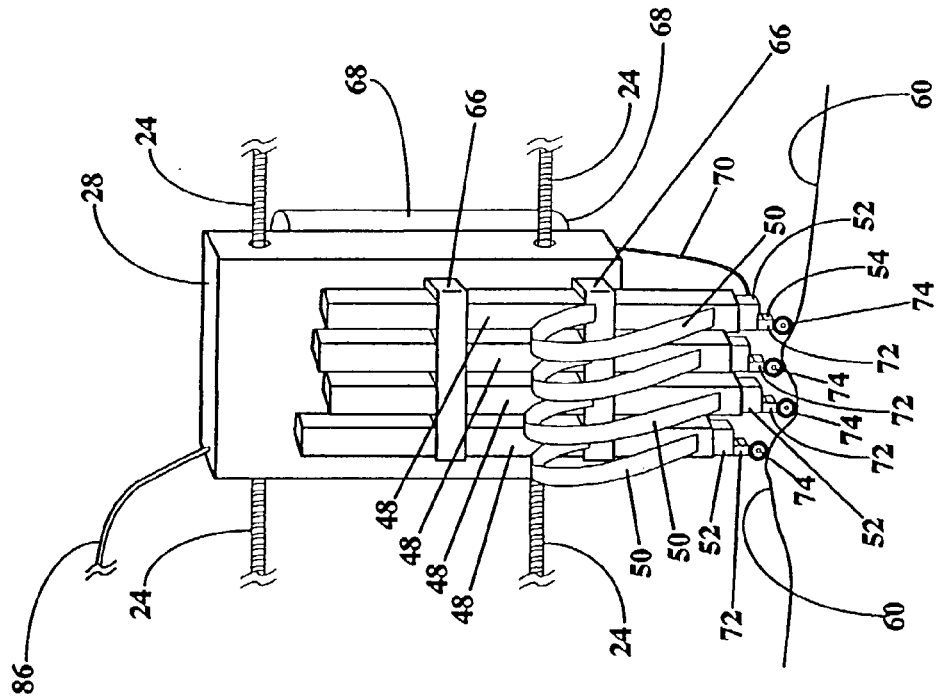
FIG. 4 is a view similar to FIG. 3 with the X-axis carriage alternatively employing a plurality of passive Z-axis carriages that are slidably mounted to a side of the X-axis carriage and are actuated in the Z-axis by a surface contour-following methodology comprising a wheel that is mounted adjacent to a print head.

FIG. 4 is a view similar to FIG. 3 with the X-axis carriage alternatively employing a plurality of passive Z-axis carriages 88 that are slidably mounted to a side of the X-axis carriage 28 and are operative in at least one Z-axis guide means 66. One or more Z-axis carriages 88 are actuated in the Z-axis by a surface contour-following means comprising a surface contour-following wheel 74 that is rotatably mounted to a wheel strut 72 which in turn is mounted adjacent to a print head 54 mounted in a lower portion of carriage(s) 88. The contour-following wheel 74 keeps the print head 1-5 mm, preferably 0.5-2 mm, above the surface of the model. In operation, each surface contour-following wheel 74 (coupled to a respective print head) contacts and rolls along an unprinted X, Z surface profile 60 as the X-axis carriage 28 is moved through the X-axis by the rotation of one or more X-axis lead-screw 24. Thus two-axis automated control (i.e., a plurality) is sufficient to render hi-resolution imaging onto any of a variety of 3D surfaces when the Z-axis movement is passively actuated as in FIG. 4 (or when a multiplicity-array of print heads are employed as mentioned in FIG. 2. In operation, when the profile of terrain rises in elevation so does the surface contour-following wheel 74 that it contacts, as can be seen in the leftmost wheel 74. When the terrain drops in elevation, the surface contour-following wheel 74 does also as can be seen with the wheel just to the right of the previously mentioned wheel. As with the elements described in FIG. 3, the passive surface contour-following means of FIG. 4 can be coupled to integral print head/print cartridges, or coupled to separate print heads that are fed by a respective coloring-agent transfer tube 70 coupled to one or more coloring-agent reservoirs 68. It is noted that although the components of FIG. 4 are shown in a scale similar to those of FIG. 3, many of the components of FIG. 4 can be substantially reduced in relative size and associated weight, or mass, to readily facilitate a free vertical movement of their respective lightweight parts in the Z-axis. It is also noted that although FIG. 4 depicts the surface contour-following means being composed of four passive Z-axis carriages 88 with their respective components, and that such a configuration would lend itself to four-color imaging of terrain and other 3D models, the Z-axis components could instead be configured with one carriage 88, or a multiplicity of passive carriages 88 similar to the array described in FIG. 2. It can also be seen in FIG. 4 that one or more print heads 54 (or alternative controllable coloring means) can be supplied by a separate source of ink, pigment, or other coloring-agent, via coloring-agent transfer tube 70 coupled to one or more coloring-agent reservoir 68.

FIG. 5 depicts the top view of an X-axis carriage 28 having a plurality of stepper motors 18 mounted adjacent to one side and a plurality of coloring-agent reservoirs 68 mounted adjacent to an opposite side. FIG. 6 shows the bottom view of the X-axis carriage 28 of FIG. 5 having a plurality of coloring-agent reservoirs 68 mounted adjacent to one side of the carriage 28, each reservoir 68 having an coloring-agent transfer tube 70 coupled to a lower end thereof extending to and coupled with a print head 54 that is operative from a lower end of a Z-axis carriage 48 such that each Z-axis carriage is slidably mounted within Z-axis guide means 66 which extends outwardly from a side of the X-axis carriage 28. FIGS. 5 and 6 also show a multi-conductor cable 86 providing electrical conduits to electronic transmissions means 16 and having sufficient conductors therein to also supply electronic transmissions to each of ribbon cables 50. While the guide means 66 of FIGS. 1 through 4 and FIG. 6 are shown having the integral print cartridge and print head assemblies mounted within a lower end of each Z-axis carriage 48 it is noted that the carriages could instead be adjoined to an upper end portion of a print cartridge, or separate print head, such that each carriage is no wider than its respectively adjoining cartridge, or print head, allowing for the closest X-axis proximity of their respective slideable components (not shown).

The apparatus can optionally be placed in an environment having a reduced atmospheric, or near-vacuum, condition so as to lessen the interaction between the air (i.e., turbulence) around the print head and the jet streams of ink shot by the print head, thus increasing the accuracy of ink placement. The air pressure interference can be controlled in one embodiment by enclosing the machine in a vacuum container and pumping out air only around the machine. Placing the machine and other apparatuses in a vacuum chamber can also reduce the air pressure. It is estimated that a modest (50% of an atmosphere) reduction in air pressure could have a noticeable effect on the quality of the printed image.

Figure 7:
FIG. 7 is a photographed three-dimensional view of a topographical model fashioned out of foam modeling material with a sealer coating applied to the surface of the three-dimensional terrain, also shown is an X-axis demarcation.

FIG. 7 is a black and white photographed three-dimensional view of a topographical model fashioned out of foam modeling material 56 with a sealer coating 78 applied thereon preferably being substantially white in appearance and being comprised of material suitable for filling small recesses in the topographical surface 58 (e.g., a slurry and/or plaster material of a type having the consistency of a drywall sealing compound). Sealer coating 78 is applied to the surface of the three-dimensional terrain model, or other model, to facilitate hi-resolution imaging onto an upper surface of the coating. The applicants of the present invention have found through experimentation that sealers having the above-described composition and characteristics allows for hi-resolution imaging—for example when employing inkjet print heads—with densities in dots-per-inch (dpi) ranging from 72 dpi on the low-end, to 720 dpi (and higher) on the high-end, with one or more colors. Other types of sealers include relatively fast-drying glues and/or resins (including white glues, epoxies, or fiberglass resins, and the like).

Figure 8:
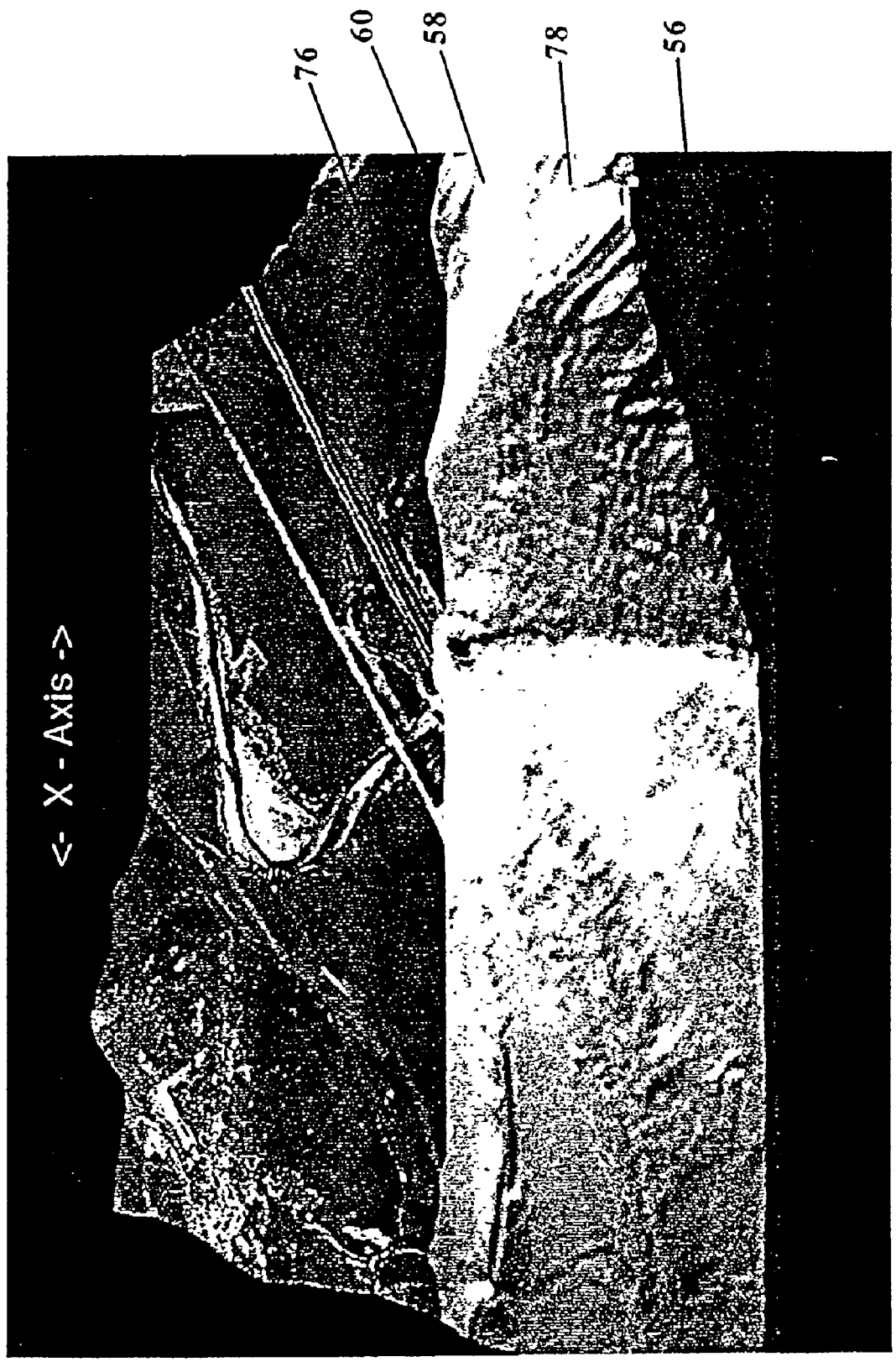
FIG. 8 is the topographical model of FIG. 7 having grayscale imagery completed up to an X,Z surface profile illustrating how hi-resolution ink imaging is applied progressively in a series of parallel and adjacent X-axis print head paths over the 3D surface.

FIG. 8 is the topographical model of FIG. 7 composed of modeling material 56 having a printed surface 76 (shown consisting of grayscale photographic imagery) partially completed up to an X, Z surface profile 60. FIG. 6 illustrates how hi-resolution imaging is efficiently applied progressively in a series of parallel and contiguously-adjacent X-axis coloring-agent paths (aligned with "<-X-Axis ->" demarcation) over a 3D surface preferably having a whitish sealer coating 78 applied to the printable surface of the model—before the model is printed. It is also noted that added durability of the imaged content is achieved by applying one or more clear finishing coats such as any one or more of a variety of known clear sealers (including sealers having a gloss or non-gloss finish).

Figure 9:
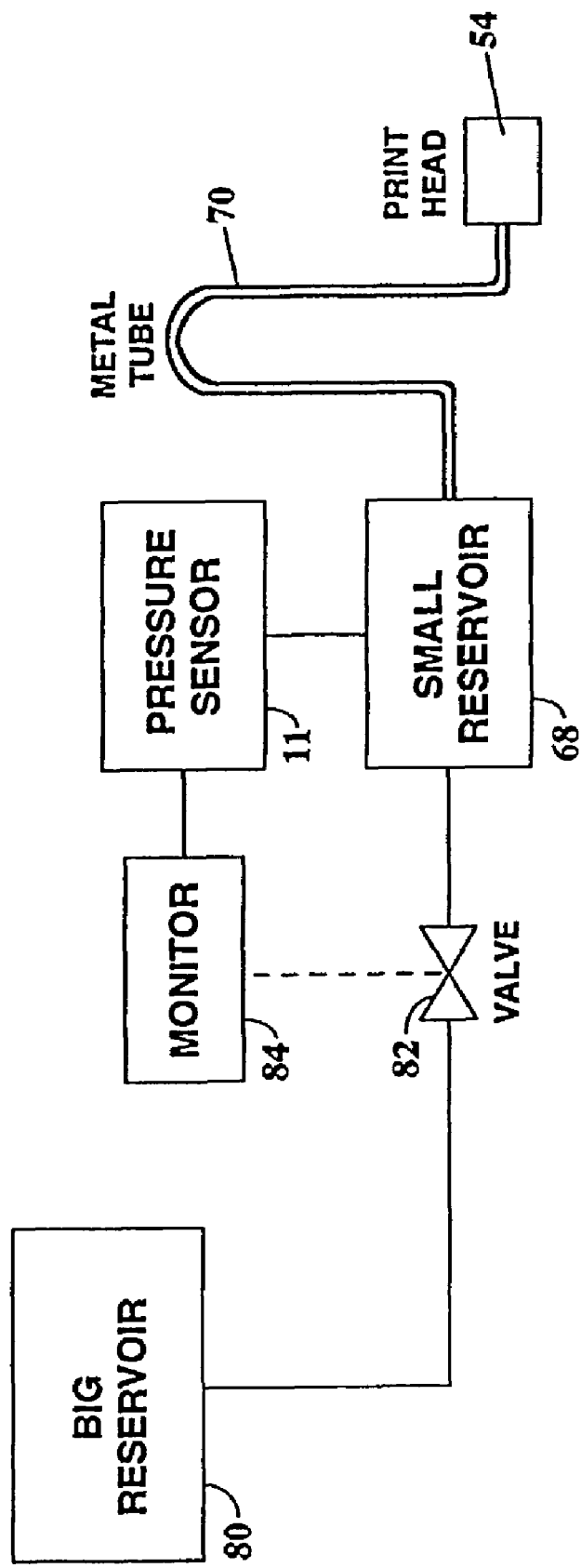
FIG. 9 is a fluid pressure fluctuation reducing mechanism of the present invention.

In reference to FIG. 9, in another embodiment of the present invention, the coloring-agent reservoir 68 is in fluid communication with a big or primary reservoir 80 via a valve 82. The valve 82 opens when a pressure sensor 11 senses that the fluid pressure in the coloring-agent reservoir 68 is below a predetermined level so that the fluid will be supplied from the primary reservoir 80 to maintain a constant pressure in the coloring-agent reservoir 68. A monitor 84 coordinates the operation of the valve 82 and the pressure sensor. The monitor 84 also initializes the print head 54 by generating −4 to −11 mm pressure in the coloring-agent reservoir 68.

In addition, a pulse-shaped tube 70 connects between the coloring-agent reservoir 68 and the print head 54. The tube 70 is generally shaped as a pulse so as to reduce or isolate the print head from the fluid pressure fluctuation in the coloring-agent reservoir 68. One arm of the tube 70 connecting with the coloring-agent reservoir 68 is leveled higher than the other arm of the tube 70 connecting with the print head 54 so as to create a negative pressure at the side of the print head 54 and ensure the fluid to flow only from the coloring-agent reservoir 68 to the print head 54. The tube 70 is made from metal or other sturdy material known in the art for feeding fluids so as to further aid in minimizing the effect of external pressures against the flow of the ink.

As an alternative to each print head 54 being composed of a single nozzle or other coloring-agent dispensing device, each print head 54 may be composed of a plurality of separate nozzles fixedly positioned next to each other in a row (not shown), each nozzle being independently controllable from the other nozzles in the same print head. Such a structure would allow several rows or cross-sections to be printed simultaneously, or a single row to have varying degrees of coloring-agent resolution, amount dispensed, intensity, layers, etc. Further, the angular positioning of each row of nozzles may be varied (e.g., the row of nozzles being positioned perpendicular, diagonally with or near parallel to the direction of travel) thereby allowing further variations in resolution, amount dispensed, intensity, etc.

As alternatives to the ink-jet printing technique as described above, mechanical pens or markers that contact the surface may be used. Also, a $CO_2$ cutting laser could etch the surface to create an image. Chemical-depositing techniques may be applied in specific forms without departing from the spirit or essential characteristics thereof. For example, the indicia may be placed onto a 3D surface by etching the surface with some resistant material for protecting some portions of the surface. In addition, masking materials, such as that used in ion deposition processes, fluorescent materials, such as Organic Light Emitting Diodes (OLEDs), magnetic materials, such as magnetic ink used in Magnetic Ink Character Recognition (MICR) technology, or photo-reactive chemicals may be applied on the 3D surface. As another example, the model is treated like a piece of photographic film by coating the model's surface with a wet photosensitive emulsion and exposing it under an enlarger in a darkroom.

Alternatively, an electrically conductive material, such as conductive ink, may be placed onto a 3D surface in a precise pattern so as to be used as part of a display system or onto a control grid in a precise pattern for sensing touch on a 3D surface.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. An automated system for dispensing ink onto a hi-accuracy three-dimensional topographical model, comprising:
    a data translator that receives topological data pertaining to said hi-accuracy three dimensional topographical model, and determines adjacent and parallel two-dimensional ink-imaging paths within a spaced proximity to the topographical model based on said topographical data; said data translator also receiving printable image content data and scaling the printable image content proportionately to the topography of the model;
    an ink dispensing means positionable in accordance with said parallel and adjacent two-dimensional ink-imaging paths; said ink dispensing means being responsive to said data translator to time the dispensing of ink in precise registration with existing surface features of said hi-accuracy three-dimensional topographical model and in accordance with the scale of said printable image content;
    a multi-axis driving device for driving said ink dispensing means in accordance with said adjacent two-dimensional ink imaging paths; and
    wherein the distance between said ink dispensing means and said topography is controlled when said multi-axis driving device drives said ink dispensing means in order to provide an optimum ink dispensing accuracy relative to the topographical complexity of each adjacent two-dimensional ink imaging path to maintain the precise registration.

2. An automated system according to claim 1, wherein the data translator includes means for interpolating the elevation data of the terrain into grid data points of a predetermined 3D grid, and means for generating motion control codes based on said grid data points.

3. An automated system according to claim 2, wherein the indicia includes pixel data associated with grid data points of the 3D grid.

4. An automated system according to claim 3, wherein the pixel data is separated into separate color data sets.

5. An automated system according to claim 3, wherein the separate pixel data sets include separate data for each of the colors cyan, magenta, yellow and black.

6. An automated system according to claim 3, wherein the pixel data is formatted for gray scale.

7. An automated system according to claim 1 further comprising a stabilization means for reducing air pressure interference in and around the ink dispensing means so as to increase accuracy of the dispensing means.

8. An automated system according to claim 7, wherein the stabilization means is a chamber enclosing the system.

9. An automated system according to claim 7, wherein the stabilization means is a vacuum chamber within which air is pumped out.

10. An automated system according to claim 1, wherein the ink dispensing means is formed to produce image resolutions between 100-1400 dpi.

11. An automated system according to claim 1, wherein the dispensing means dispenses at least one coloring-agent made from at least one of a dye, paint and pigment, so as to apply the indicia.

12. An automated system according to claim 1, wherein the dispensing means include at least one mechanical pen or marker.

13. An automated system according to claim 1, wherein the dispensing means include a $CO_2$, cutting laser for etching the model to create an image.

14. An automated system according to claim 13, wherein the dispensing means includes a plurality of dispensing elements, each element for dispensing a different coloring-agent.

15. An automated system according to claim 1, wherein the dispensing means is formed to dispense at least one of a magnetic material, a photo-reactive material, and an electrically conductive material.

16. An automated system according to claim 15, wherein the photo-reactive material is a photo-sensitive emulsion to be coated on the surface of the model and exposed under an enlarger in a darkroom.

17. An automated system according to claim 15, wherein the electrically conductive material is placed onto a three-dimensional surface in a precise pattern so as to be used as part of a display system.

18. An automated system according to claim 15, wherein the electrically conductive material is placed onto a control grid in a precise pattern for sensing a touch onto a three-dimensional surface.

19. An automated system according to claim 15, wherein the electrically conductive material is conductive ink.

20. An automated system according to claim 15, wherein the magnetic material is magnetic ink used in Magnetic Ink Character Recognition (MICR) technology.

21. An automated system according to claim 1, wherein the dispensing means includes a dispensing outlet, a dispensing reservoir for storing a fluid to be dispense via the dispensing outlet to the model, a dispensing pressure control means for maintaining fluid pressure in the reservoir so as to prevent uncontrolled variations in the dispensing means.

22. An automated system according to claim 21, wherein the dispensing pressure control means includes a pulse-shaped tube connected between the dispensing reservoir and the dispensing outlet so as to reduce or isolate the dispensing outlet from the fluid pressure fluctuation in the reservoir and thereby prevent uncontrolled variations in the dispensing means.

23. An automated system according to claim 22, wherein the tube made from metal.

24. An automated system according to claim 21, wherein the dispensing pressure control means includes a fluid pressure sensor in fluid communication with the dispensing reservoir for sensing the fluid pressure in the dispensing reservoir, a primary reservoir connecting to the dispensing reservoir via a valve so as to maintain a constant fluid pressure in the dispensing reservoir.

25. An automated system according to claim 1, wherein the ink dispensing means includes at least one sensor for sensing the surface of the model so as to prevent the ink dispensing means from colliding with the model.

26. An automated system according to claim 1, wherein the data translator includes means for interpolating the elevation data of the terrain into grid data points of a predetermined 3D grid, and the dispensing means is operatively connected with the multi-axis driving device so as to travel along a serpentine pattern in response to the grid data points of the 3D grid.

27. An automated system according to claim 2, wherein the dispensing means is operatively connected with the multi-axis driving device so as to travel along a serpentine pattern in response to the motion control codes.

28. An automated system according to claim 1, wherein the multi-axis driving device comprises a friction-reducing means for facilitating free movement in a single axis.

29. An automated system according to claim 28, wherein the friction-reducing means is a guide bearing.

30. An automated system according to claim 28, wherein the friction-reducing means is at least one of tongue-in-groove guide and a guide roller.

31. An automated system according to claim 1, wherein the multi-axis driving device comprises a horizontal guide means moving in a first direction and a second horizontal guide means moving in a second direction perpendicular to said first direction.

32. An automated system according to claim 1, wherein the driving device comprises means for determining motion paths and speeds for the ink dispensing means in response to the two dimensional contours of the ink imaging paths.

33. An automated system according to claim 1, wherein the driving device includes means for determining motion paths and speeds for the dispensing means in response to motion control codes.

34. An automated system according to claim 33, wherein the determining means being further for determining the motion paths and speeds for the dispensing means in response to input information including a size of the dispensing means, a material of the dispensing means and a material of the object to be cut.

35. An automated system according to claim 34, wherein the determining means being further for determining the motion paths and speeds for the dispensing means in response to input information including a selected scale of the terrain to be made into the model.

36. An automated system according to claim 33, wherein the determining means being further for determining at least one of abnormalities and errors in the motion control codes and in input information so as to detect inconsistent parameters, radical changes in data or data errors.

37. An automated system according to claim 36, wherein the determining means being further for determining at least one of abnormalities and errors in the motion control codes and in input information so as to reconcile inconsistent parameters, radical changes in data for data errors.

38. An automated system according to claim 36, wherein said determining means is operatively connected to generate warning signals to a user in response to detected abnormalities and errors.

39. An automated system according to claim 1, wherein the multi-axis driving device includes at least one stepper motor.

40. An automated system according to claim 39, wherein the multi-axis driving device further includes at least one stepper motor-driven lead-screw per axis, and the dispensing means is affixed to and operative from one of the lead-screws.

41. A dispensing apparatus according to claim 1, wherein the dispensing means includes a plurality of print heads, each of the print heads being operatively connected to dispense a coloring-agent different from the other print heads.

42. A dispensing apparatus according to claim 41, wherein each of the plurality of print heads includes a nozzle for dispensing a respective coloring-agent.

43. A dispensing apparatus according to claim 41, wherein each of the plurality of print heads includes a plurality of nozzle for dispensing a respective coloring-agent.

44. An automated system according to claim 1, wherein the dispensing means dispenses at least one coloring-agent made from an ink so as to apply the indicia.

45. An automated system according to claim 1, wherein the dispensing means include a nozzle.

46. An automated system according to claim 1, wherein the dispensing means is formed to dispense a fluorescent material.

47. An automated system according to claim 46, wherein the fluorescent material contains Organic Light Emitting Diodes.

* * * * *